United States Patent [19]
Wang

[11] Patent Number: 5,521,822
[45] Date of Patent: May 28, 1996

[54] METHOD FOR CONTROLLING ACTUATION OF A VEHICLE SAFETY DEVICE USING FILTERED VEHICLE DECELERATION DATA

[75] Inventor: Jenne-Tai Wang, Troy, Mich.

[73] Assignee: General Motors Corporation, Detroit, Mich.

[21] Appl. No.: 351,857

[22] Filed: Dec. 8, 1994

[51] Int. Cl.⁶ .................................................. B60R 21/32
[52] U.S. Cl. ................... 364/424.05; 340/669; 307/10.1; 280/735; 180/282
[58] Field of Search ....................... 364/424.05; 340/436, 340/669; 307/10.1; 280/734, 735; 180/274, 282

[56] References Cited

U.S. PATENT DOCUMENTS

| | | | |
|---|---|---|---|
| 5,021,678 | 6/1991 | Diller | 307/10.1 |
| 5,040,118 | 8/1991 | Diller | 364/424.05 |
| 5,081,587 | 1/1992 | Okano | 364/424.05 |
| 5,216,607 | 6/1993 | Diller et al. | 364/424.05 |
| 5,229,943 | 7/1993 | Elgler et al. | 364/424.05 |
| 5,262,949 | 11/1993 | Okano et al. | 364/424.05 |
| 5,285,187 | 2/1994 | Hirao et al. | 340/436 |
| 5,337,238 | 8/1994 | Gloutsos et al. | 364/424.05 |
| 5,339,242 | 8/1994 | Reid et al. | 364/424.05 |
| 5,382,049 | 1/1995 | Hiramitsu et al. | 280/735 |
| 5,394,326 | 2/1995 | Liu | 364/424.05 |
| 5,394,328 | 2/1995 | Huang | 364/424.05 |

Primary Examiner—Kevin J. Teska
Assistant Examiner—Tyrone V. Walker
Attorney, Agent, or Firm—Timothy G. Gorbatoff

[57] ABSTRACT

The present invention is directed to a filtering technique for improving the capability of crash sensing systems in distinguishing between severe and minor crash events. The onset of a crash event is detected when a sensed vehicle deceleration exceeds a deceleration threshold value. Following the onset of the crash event, a crash severity parameter is calculated at predetermined intervals as a function of vehicle deceleration. At the conclusion of a predetermined time period, a value of the crash severity parameter less than or equal to a parameter threshold value corresponds to a minor crash incident. A value greater than the parameter threshold value corresponds to a potential severe crash event requiring airbag deployment, thereby necessitating further crash severity discrimination. Before continuing, crash severity parameters having specific signal trace characteristics discard deceleration data generated during the initial stages of the crash event, preventing potentially misleading deceleration data from influencing airbag deployment. A severe crash event is characterized by the values of multiple crash severity parameters simultaneously exceeding their respective deployment threshold levels. A value of at least one of the crash severity parameters less than a predetermined reset threshold value corresponds to a minor crash incident.

6 Claims, 4 Drawing Sheets

METHOD FOR CONTROLLING ACTUATION OF A VEHICLE SAFETY DEVICE USING FILTERED VEHICLE DECELERATION DATA

This invention relates to a method of filtering motor vehicle deceleration data used for controlling actuation of a motor vehicle safety device, and more particularly, to improve the immunity of a crash sensing system to minor incidents, such as rough road events and low speed undercarriage hits, which do not require actuating vehicle safety devices, such as airbags and seat belt pre-tensioners.

BACKGROUND OF THE INVENTION

A vehicle crash sensing system detects and discriminates severe crash events which require deployment of an airbag, such as those listed in Table 1, from minor crash incidents which do not, such as those listed in Table 2.

TABLE 1

| Type of Collision | Speed Range (mph) |
| --- | --- |
| Full frontal to barrier (F/B) | 12–30 |
| 30° right angle to barrier (R/B) | 20–30 |
| 30° left angle to barrier (L/B) | 20–30 |
| On-center pole (C/P) | 15–30 |
| Full frontal to rear of parked car | 60 |

TABLE 2

| Event or Incident | Upper Speed (mph) |
| --- | --- |
| Undercarriage Hit (U/H) | 20 |
| Car to Deer (D/H) | 50 |
| Square block road (S/B) | 40 |
| Chatter bumps | 60 |
| Hood slams | N/A |
| Door Slams | N/A |
| Hammer blows (5–8 lbs.) | N/A |

Discrimination is accomplished by means of a vehicle-mounted accelerometer and an associated signal processing algorithm contained within a microprocessor. Since the total available time for deploying an airbag to effectively restrain occupants in a severe crash event is very short, the ability to quickly and reliably determine the severity of a collision is paramount. Equally important is the system's immunity to inadvertent deployment during minor crash incidents.

Many prior art airbag deployment algorithms have been developed which utilize one or more quantities for measuring the severity of a collision. These "quantities" or "parameters" have included vehicle velocity change, energy, power, power-rate, jerk, predicted occupant/interior contact velocity, predicted occupant movement, energy of a vehicle deceleration signal, and oscillation measure of the vehicle deceleration signal. The value of these quantities are generally calculated as a function of successively sampled accelerometer data. Based upon test data obtained from the accelerometer during a representative set of minor crash incidents, one or more boundary thresholds are set. Airbag deployment is initiated whenever the values of some or all of these quantities exceed their respective boundary thresholds.

For example, in U.S. Pat. No. 5,339,242, issued Aug. 16, 1994, to Reid et al., a crash sensing system is disclosed in which time-dependent jerk and velocity change data represent two crash severity conditions which are continually consulted following the onset of a crash event in order to determine whether vehicle safety devices should be actuated.

As illustrated in FIG. 1, many minor crash incidents including, 20 mph undercarriage hits (U/H) 10, 50 mph simulated deer hits (D/H) 12 and square block rough road incidents (S/B) 14 are characterized by a rapid decrease in vehicle velocity over a relatively short duration, which thereafter quickly levels off. On the other hand, FIG. 2 illustrates that vehicle velocity changes of severe crash events including, 30 mph frontal barrier (F/B) 16, 30 mph left angle to barrier (L/B) 18, 30 mph right angle to barrier (R/B) 20, 30 mph on center high pole (C/P) 22 and 13 mph increase slowly following the onset of the crash event but shortly thereafter increases monotonically.

As can be realized from the above, if vehicle velocity change (calculated as a function of acceleration) is used as a crash severity parameter, accelerometer data generated during the initial stages of a crash event (e.g., up to the first 25 msec.) can be misleading. A nondeployment type minor crash incidem may initially produce a higher deceleration signal value (and corresponding higher velocity change value) than a deployment type severe crash event. Lowering threshold levels to increase deployment sensitivity (i.e., reduce deploymere time) may result in the initially higher velocity change values of the minor crash incidents exceeding the boundary threshold levels, inadvertently deploying the airbag.

Use of crash severity parameters other than vehicle velocity change characterized by similar severe-versus-minor crash event signal traces as those of the vehicle velocity change parameter will similarly be susceptible to the potentially misleading acceleration data generated during the initial stages of the crash event.

SUMMARY OF THE INVENTION

The present invention is directed to a filtering technique for improving the capability of crash sensing systems in distinguishing between severe and minor crash events. In so doing, the respective boundary threshold levels can be lowered to reduce deployment time without negatively impacting the system's immunity to minor crash incidents. This filtering technique can be an add-on feature to existing crash sensing methods to achieve improved performance.

According to one aspect of the present invention, the onset of a crash event is sensed by a vehicle-mounted accelerometer when the detected vehicle deceleration exceeds a predetermined deceleration threshold value. Following the onset of the crash event, a change in vehicle velocity is calculated at predetermined intervals as a function of the deceleration data obtained from the accelerometer, each incremental change being added to the previous change to arrive at a resultant summation of changes in vehicle velocity occurring since the onset of the crash event.

At the conclusion of a predetermined time period, the resultant sum change in vehicle velocity is compared to a predetermined threshold value. A value less than or equal to the threshold value corresponds to a nondeployment type minor crash incident. A value greater than the threshold value corresponds to a potential deployment type severe crash event requiring further crash severity discrimination for determining the necessity of airbag deployment. First, however, the value of the vehicle velocity change parameter is reset to zero. This eliminates the effects of deceleration data generated during the initial stages of the crash event upon subsequent calculations of the vehicle velocity change value, thereby preventing potentially misleading deceleration data from influencing airbag deployment.

According to another aspect of the present invention, a severe crash event is characterized by the values of multiple crash severity parameters simultaneously exceeding their respective deployment threshold levels, one of the crash severity parameters being the vehicle velocity change. A value of at least one of the crash severity parameters less than a predetermined reset threshold value corresponds to a nondeployment type minor crash incident (e.g., rough road incident or low speed undercarriage hit).

These and other aspects and advantages of the invention may be best understood by reference to the following detailed description of the preferred embodiment when considered in conjunction with the accompanying drawings.

DETAILED DESCRIPTION OF THE PREFERRED EMBODIMENT

The filter of the present invention is not sufficient by itself to provide complete discrimination between severe and minor crash events for deployment of an airbag. Rather, it is intended to enhance a main crash sensing system. According to the crash sensing system of the present invention, discrimination between deployment and nondeployment type crash events is based upon a two-pan criteria: (i) oscillation measure of the vehicle acceleration trace and (ii) vehicle velocity change of the vehicle after impact.

The formula for calculating oscillation measure (OM) is:

$$OM = \int |da(t)/dt| dt \quad (1)$$

The derivative of acceleration gives the rate of change of acceleration (referred to as the jerk). The total area under the jerk curve is an indication of how the acceleration is oscillating over time. Total area is the integral of the jerk curve (using absolute value to counter subtracting area when jerk goes negative). If an acceleration contains high oscillation (both frequency and magnitude) then this oscillation measurement becomes very large.

The second criteria involves detecting vehicle velocity changes occurring after impact, calculated in accordance with the following formula:

$$\text{Velocity Change} = \int a(t) dt \quad (2)$$

In accordance with the crash sensing system, airbag deployment is triggered if a crash event exceeds both an Oscillation Boundary Curve (OBC) and a Velocity Boundary Curve (VBC), indicative of a severe crash event.

Figure 3:
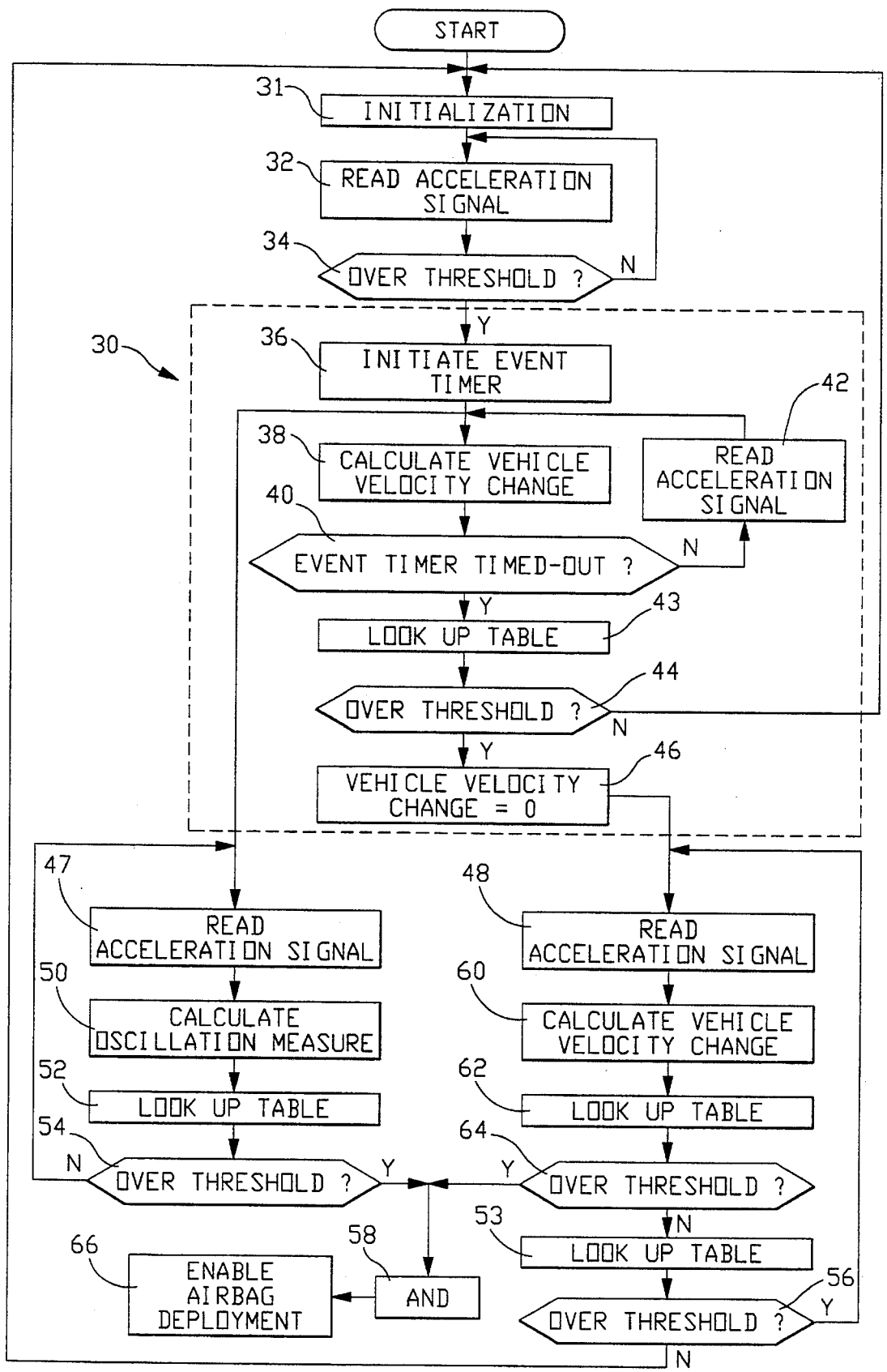
FIG. 3 illustrates a flow diagram representative of computer program instructions in carrying out the method of the present invention.

The filtering technique of the present invention is contained within the airbag deployment methodology represented by the microprocessor program instructions illustrated in FIG. 3. Referring to FIG. 3, reference numeral 30 generally refers to the filter portion of the crash sensing methodology comprising steps 36–46. Referring to FIG. 3, the crash sensing system begins at step 31 with initialization, which includes the resetting of all applicable timers and memory locations containing the values of crash sensing parameters. After initialization 31, an acceleration signal is read in step 32 from a vehicle-mounted accelerometer and compared in step 34 with a threshold deceleration value. If the detected deceleration exceeds the threshold deceleration value, the vehicle is assumed to be undergoing an impact and crash discrimination calculations are initiated, beginning with the filter 30 of the present invention.

The filtering technique 30 begins at step 36 in which a crash event timer is activated (i.e., begins to time-out). The timer value will vary between vehicle models depending upon the particular structural design of the vehicle, but will generally be between 1–25 msec. At step 38, a crash severity parameter (in this case, the change in vehicle velocity) is initially calculated as a function of the acceleration signal read at step 32. The integral of the acceleration signal (which is equal to the change in vehicle velocity) is a simplified means of indicating the kinetic energy of the vehicle impact.

The vehicle velocity change is repetitively calculated in step 38, each time being updated with new acceleration data read in step 42, until the event timer completely times-out as determined by step 40. Once the event timer has timed-out 40, the then-existing value of the energy measure calculated in step 38 is compared in step 44 with a threshold value obtained from a look up table in step 43 which contains time-dependant velocity change values. Alternatively, the value obtained from the look up table can be a single constant value or calculated in accordance with a formula. If the threshold value for the look up table time entry point following the onset of the crash event is exceeded, as determined by the COMPARE function of step 44, the current vehicle impact is determined to be a potentially severe crash event requiring further crash discrimination. Failure of the crash severity parameter value to exceed the threshold value in step 44 is indicative of a minor nondeployment type crash event. If such is the case, the algorithm is reinitialized at step 31.

As an option, to ensure that the vehicle is still undergoing a crash event, step 44 could also compare the current vehicle deceleration with the deceleration threshold value. If the current vehicle deceleration does not exceed the deceleration threshold value, the algorithm is reinitialized at step 31.

Once a potentially severe crash event is identified by step 44, further discrimination calculations must be performed to determine the necessity and timing of airbag deployment. This is generally achieved by comparing values of multiple crash severity parameters with corresponding threshold boundary curves. As noted above, the acceleration data obtained prior to the expiration of the event timer in step 40 may be misleading, depending upon the crash severity parameters being utilized. Those parameters, such as vehicle velocity change, having signal traces characterized by (i) for minor crash incidents - an initially rapid response in a relatively short duration which then levels off, and (ii) for severe crash events - an initially slow response which thereafter increases rapidly, are particularly susceptible to acceleration data generated during the initial stages of the crash event. For this reason, the value of these crash severity parameters are reset to zero in step 46 so as not to influence subsequently calculated values of the crash severity parameter, which would thereby affect its value with respect to the boundary curves and ultimately influence deployment.

Further discrimination and deployment calculations are conducted in accordance with a two-part criteria, including: (i) an oscillation measure value (OM) with respect to an oscillation boundary curve (OBC), and (ii) the change in vehicle velocity with respect to a velocity boundary curve (VBC).

The oscillation measure portion of the algorithm begins at step 47 by rereading accelerometer data. Note that the accelerometer data used for calculating oscillation measure is not discarded by filter 30. Rather, calculation of oscillation measure begins immediately after the event timer is actuated in step 36. This is because the signal trace of the oscillation measure of the acceleration data does not demonstrate the "acceleration-sensitive" characteristics that parameters such as the vehicle velocity change.

Using the acceleration data read in step 47, the oscillation measure is calculated in step 50 and compared in step 54 with a time-based oscillation threshold value (OBC) obtained from a look up table value at step 52 for the appropriate time into the crash event. If the oscillation threshold value of step 52 is exceeded as determined by a COMPARE function at step 54, the first of the two part criteria of step 58 is met. If the oscillation threshold value of step 52 is not exceeded, the oscillation measure portion of the algorithm repeats until its value exceeds the oscillation threshold value in step 54 or the crash sensing algorithm is reinitialized in step 3 1.

The second of the two-part criteria is the vehicle velocity change value. This portion of the algorithm begins at step 48 by rereading the accelerometer data. Note that this parameter initially has a value of zero, its value being reset in step 46. The velocity change value is calculated in step 60 and compared in step 64 with a velocity change threshold value (VBC) obtained from a look up table value at step 62 for the appropriate time into the crash event. If the velocity change threshold value of step 62 is exceeded as determined by a COMPARE function in step 64, the second of the two part criteria of step 58 is met. As an option, to ensure that the vehicle is still involved in a crash event, step 64 could also compare a current deceleration value with the deceleration threshold value. If at any time the deceleration value drops below the deceleration threshold value, the algorithm is reinitialized in step 31.

Figure 4:
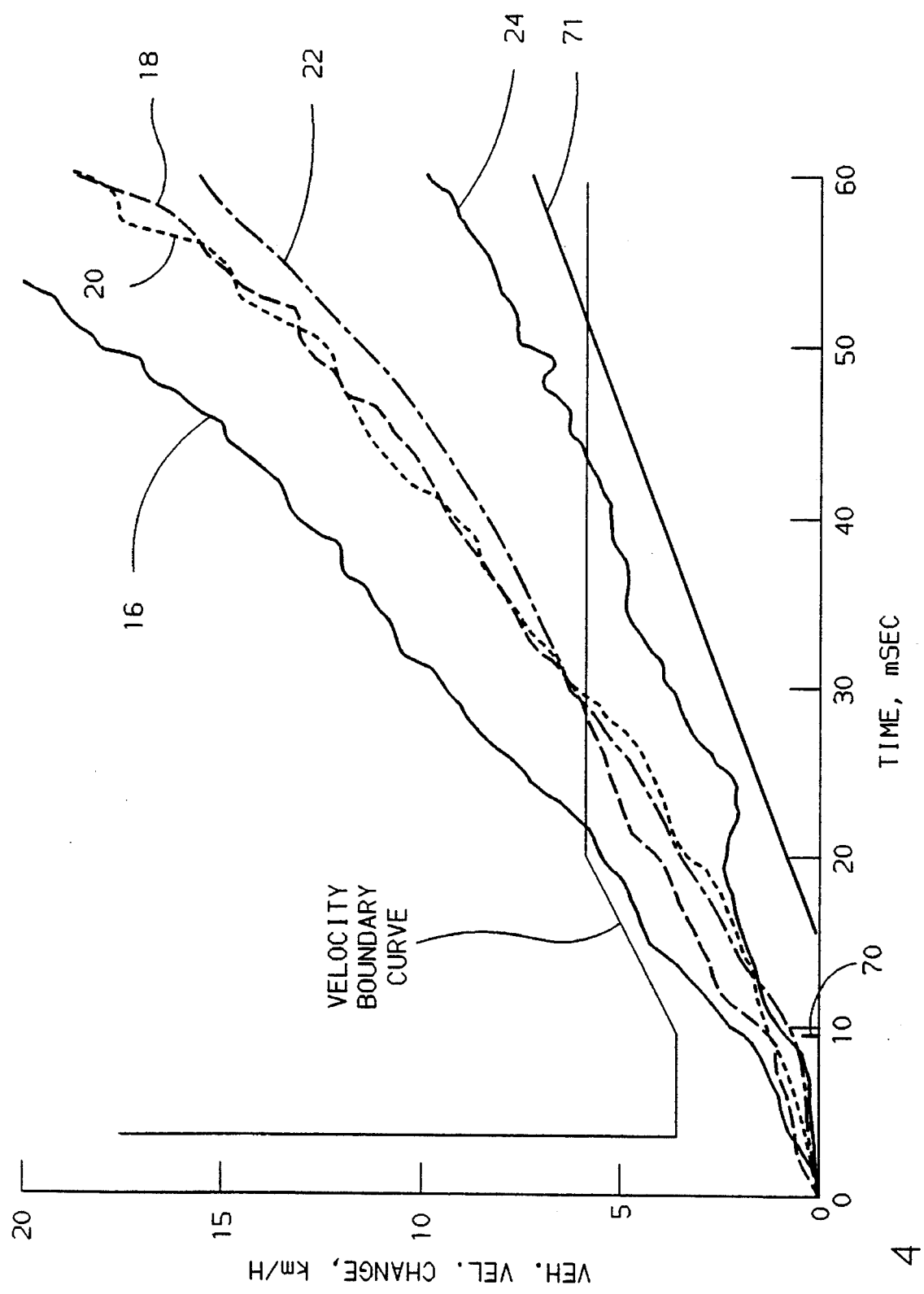
FIG. 4 is a graph of time vs. velocity change curves for a vehicle experiencing various types of severe crash events, incorporating multiple reset threshold levels.

If the velocity change threshold value of step 62 is not exceeded, the velocity change value of step 60 is compared in step 56 with a time-based reset threshold value obtained from a look up table value at step 53 for the appropriate time into the crash event. If the vehicle change value of step 60 drops below the reset threshold value of step 53, as determined by a COMPARE function in step 56, the sensed vehicle impact is determined to be of a minor nondeployment type. If such is the case, the algorithm reinitializes at step 31. If, however, the velocity change value of step 60 remains above the reset threshold value of step 53, calculation of the velocity change value repeats until the velocity change value drops below the reset threshold value or a crash event is no longer sensed by step 64. FIG. 4 is a graph of time vs. velocity change curves for a vehicle experiencing various types of severe crash events, incorporating multiple time-based reset threshold levels 70 and 71.

Referring back to FIG. 3, if both the oscillation measure and velocity change values exceed their respective deployment threshold boundary values, a severe deployment-type crash event is identified and an airbag deployment enable command is generated at step 66. If only one, or neither, of the thresholds are exceeded, no deployment command is enabled.

In accordance with the present invention, the acceleration data accumulated during a predetermined time period following the onset of a crash event is used to assist in an initial determination as to the severity of the crash event, identifying a certain category of nondeployment type minor crash incidents. If unable to identify the current crash event as of this category, the algorithm continues by making a definite determination in accordance with a two-part criteria. To prevent misleading acceleration data from being used in determining deployment, future calculations of certain crash severity parameters discard acceleration data generated during the predetermined time period.

As noted earlier, the acceleration data during the initial stages of a crash event can be misleading, with the value of deceleration during a minor crash incident being greater than that of a severe crash event, increasing the values of the corresponding crash severity parameters used for deployment of the airbag. For this reason, deployment threshold values must be maintained at a certain level to prevent inadvertent deployment. However, incorporating the filtering technique 30 of the present invention into a crash sensing system, deployment threshold levels can be lowered to increase sensitivity of the safety devices without sacrificing immunity to inadvertent actuation during minor crash incidents.

Figure 1:
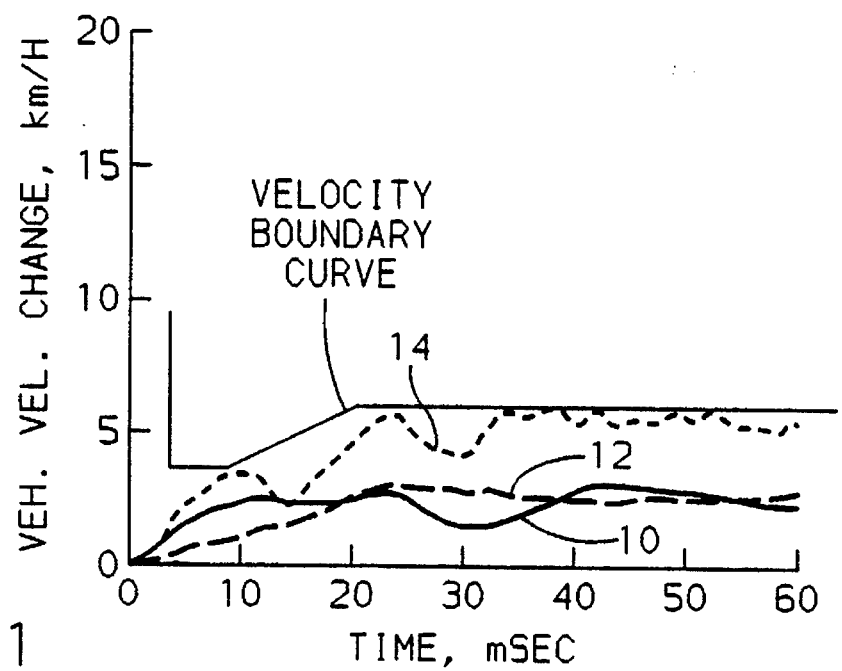
FIG. 1 is a graph of time vs. velocity change curves for a vehicle experiencing various types of minor crash incidents.
Figure 2:
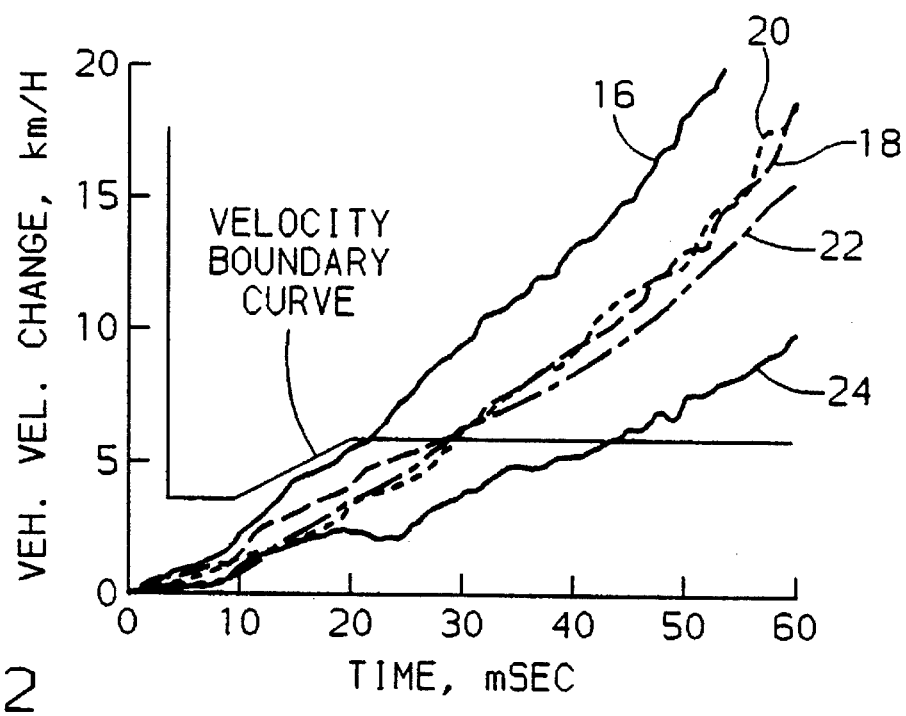
FIG. 2 is a graph of time vs. velocity change curves for a vehicle experiencing various types of severe crash events.
Figure 5:
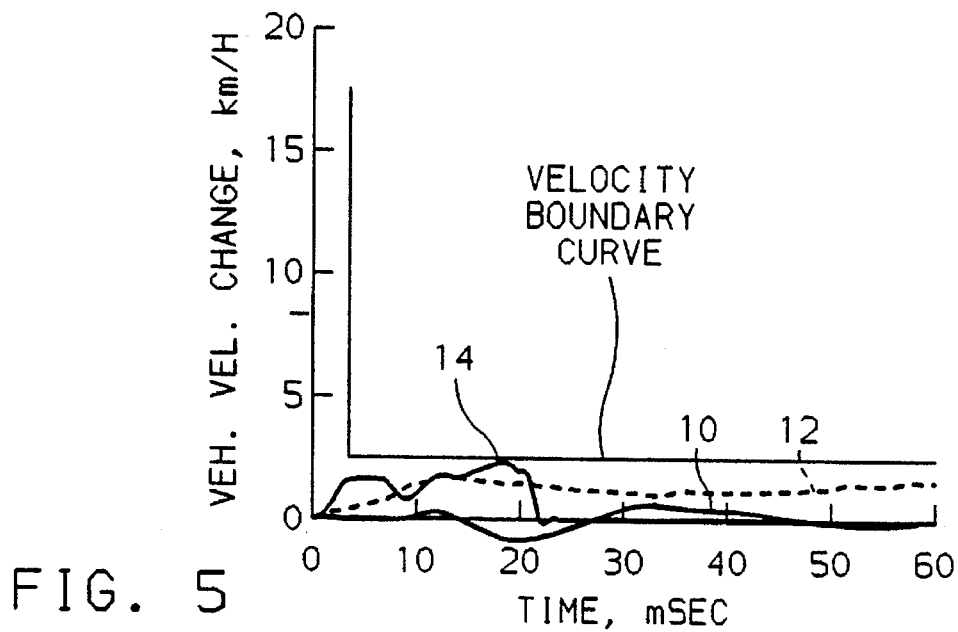
FIG. 5 is a graph of time vs. velocity change curves for a vehicle equipped with a crash sensing algorithm incorporating the filter of the present invention and experiencing various types of minor crash incidents.
Figure 6:
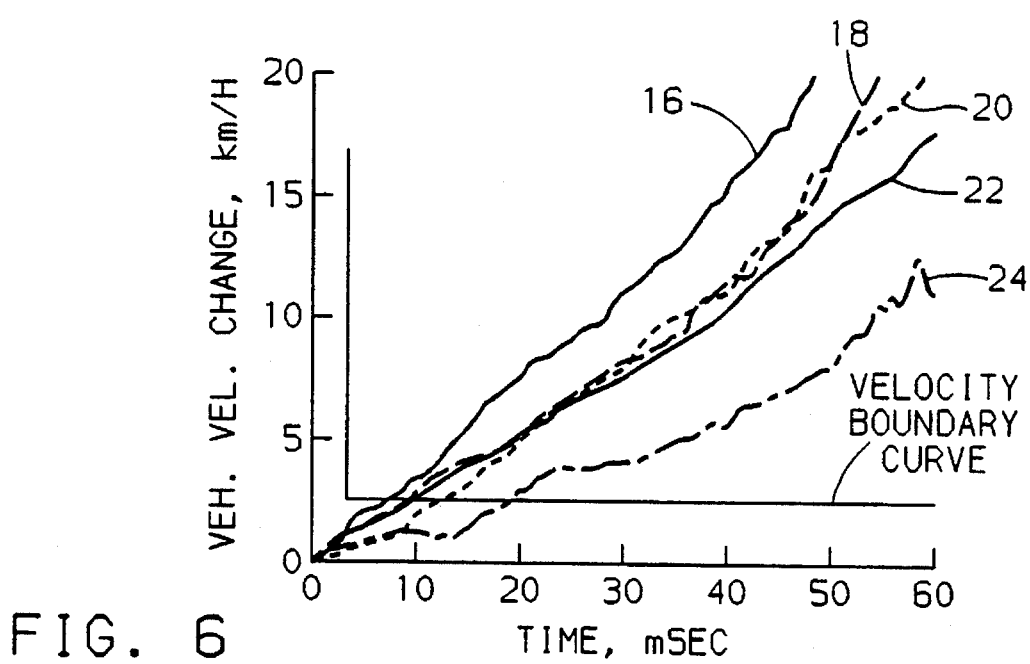
FIG. 6 is a graph of time vs. velocity change curves for a vehicle equipped with a crash sensing algorithm incorporating the filter of the present invention and experiencing various types of severe crash events.

FIGS. 5 and 6 illustrate graphs of time vs. velocity change curves for a vehicle experiencing various types of minor and severe crash events, respectively, the vehicle employing a crash sensing methodology utilizing the filtering technique of the present invention. Comparing FIG. 5 with FIG. 2, and FIG. 6 with FIG. 3, the influence of the filtering technique of the present invention on the corresponding velocity curves can be seen. Note that the velocity boundary curves (VBC) can be lowered considerably.

Although the crash sensing system of the preferred embodiment utilizes vehicle velocity change and oscillation measure as crash severity parameters, the filtering technique of the present invention can be incorporated into any crash sensing system utilizing crash severity parameters other than those described.

While the present invention has been described in reference to the illustrated embodiments, it will be recognized that various modifications will occur to those skilled in the art. In this regard, it will be understood that methods incorporating such modifications may fall within the scope of this invention which is defined by the appended claims.

The embodiments of this invention in which an exclusive property or privilege is claimed are defined as follows:

1. A method for controlling actuation of a vehicle safety device comprising, in combination, the steps of:

sampling vehicle deceleration data at a predetermined sampling rate to obtain discrete values of deceleration;

comparing the discrete values of deceleration with a deceleration threshold to detect the onset of a crash event;

calculating, upon the onset of a detected crash event, a first crash severity parameter value as a function of the discrete values of deceleration;

calculating, upon the onset of a detected crash event, values for at least one additional crash severity parameter, each as a function of the discrete values of deceleration;

updating the values of the first and additional crash severity parameters at predetermined time intervals; and comparing the value of the first crash severity parameter at the conclusion of a predetermined time period to a first threshold value, a value of the first crash severity parameter not exceeding the first threshold value indicative of a minor crash event not necessitating actuation of the vehicle safety device, and a value of the first crash severity parameter exceeding the first threshold value indicative of a potentially severe crash event requiring further crash severity discrimination for determining the necessity of actuating the vehicle safety device, such further crash severity discrimination comprising, in combination, the steps of:

setting the value of the first crash severity parameter to zero wherein the vehicle deceleration values sampled prior to the end of the predetermined time period are discarded and do not contribute to subsequently calculated values of the first crash severity parameter;

comparing the values of the first crash severity parameter with a second threshold value and the values of the additional crash severity parameters with respective additional threshold values; and actuating the vehicle safety device when (i) a value of the first crash severity parameter exceeds the second threshold value, and (ii) the values of each of the additional crash severity parameters exceed their respective additional threshold values.

2. A method for controlling actuation of a vehicle safety device comprising, in combination, the steps of:

sampling vehicle deceleration data at a predetermined sampling rate to obtain discrete values of deceleration;

comparing the discrete values of deceleration with a deceleration threshold to detect the onset of a crash event;

calculating, upon the onset of a detected crash event, first and second crash severity parameter values as functions of the discrete values of deceleration;

updating the values of the first and second crash severity parameters at predetermined time intervals; and comparing the value of the first crash severity parameter at the conclusion of a predetermined time period to a first threshold value, a value of the first crash severity parameter not exceeding the first threshold value indicative of a minor crash event not necessitating actuation of the vehicle safety device, and a value of the first crash severity parameter exceeding the first threshold value indicative of a potentially severe crash event requiring further crash severity discrimination for determining the necessity of actuating the vehicle safety device, such further crash severity discrimination comprising, in combination, the steps of:

setting the value of the first crash severity parameter to zero wherein the vehicle deceleration values sampled prior to the end of the predetermined time period are discarded and do not contribute to subsequently calculated values of the first crash severity parameter;

comparing the values of the first crash severity parameter with a second threshold value and the values of the second crash severity parameter with a third threshold value; and actuating the vehicle safety device when (i) a value of the first crash severity parameter exceeds the second threshold value, and (ii) a value of the second crash severity parameter exceeds the third threshold value.

3. The method for controlling actuation of a vehicle safety device according to claim 2, further comprising the step of comparing the value of the first crash severity parameter with a reset threshold value if the value of the first crash severity parameter, when compared with the second threshold value, does not exceed the second threshold value, a value of the first crash severity parameter less than the reset threshold value indicative of a minor crash event not requiring actuation of the vehicle safety device.

4. The method for controlling actuation of a vehicle safety device according to claim 3, wherein the reset threshold value is variable over time.

5. The method for controlling actuation of a vehicle safety device according to claim 2, further comprising the step of comparing the value of the second crash severity parameter with a reset threshold value if the value of the second crash severity parameter, when compared with the third threshold value, does not exceed the third threshold value, a value of the second crash severity parameter less than the reset threshold value indicative of a minor crash event not requiring actuation of the vehicle safety device.

6. The method for controlling actuation of a vehicle safety device according to claim 5, wherein the reset threshold value is variable over time.

* * * * *